United States Patent
Veres et al.

(10) Patent No.: US 6,807,156 B1
(45) Date of Patent: Oct. 19, 2004

(54) SCALABLE REAL-TIME QUALITY OF SERVICE MONITORING AND ANALYSIS OF SERVICE DEPENDENT SUBSCRIBER SATISFACTION IN IP NETWORKS

(75) Inventors: Andras Veres, Budapest (HU); Attila Farago, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 733 days.

(21) Appl. No.: 09/706,759

(22) Filed: Nov. 7, 2000

(51) Int. Cl.$^7$ .............................................. H04L 12/26
(52) U.S. Cl. ............ 370/252; 370/395.21; 370/395.52; 709/232; 711/216
(58) Field of Search ................................ 370/252, 253, 370/389, 392, 395.1, 395.21, 395.32, 395.52, 471; 709/232, 234, 235, 238, 202, 216; 711/202, 216

(56) References Cited

U.S. PATENT DOCUMENTS

| | | | |
|---|---|---|---|
| 4,775,973 A | 10/1988 | Tomberlin et al. | |
| 5,097,469 A | 3/1992 | Douglas | |
| 5,251,152 A | 10/1993 | Notess | |
| 5,414,704 A | * | 5/1995 | Spinney ........................ 370/389 |
| 5,446,874 A | 8/1995 | Waclawsky et al. | |
| 5,487,012 A | 1/1996 | Topholm et al. | |
| 5,568,471 A | 10/1996 | Hershey et al. | |
| 5,867,483 A | 2/1999 | Ennis, Jr. et al. | |
| 6,046,980 A | 4/2000 | Packer | |
| 6,401,117 B1 | * | 6/2002 | Narad et al. ................. 709/223 |
| 6,625,650 B2 | * | 9/2003 | Stelliga ....................... 709/226 |
| 6,690,659 B1 | * | 2/2004 | Ahmed et al. .............. 370/328 |
| 6,691,165 B1 | * | 2/2004 | Bruck et al. ................. 709/227 |

FOREIGN PATENT DOCUMENTS

| | | | |
|---|---|---|---|
| WO | WO 99/27684 | 6/1999 | |
| WO | WO 00/31963 | 6/2000 | |
| WO | WO 00/33511 | 6/2000 | |
| WO | WO 00/51292 | 8/2000 | |
| WO | WO 00/51292 A1 | 8/2000 | ........... H04L/12/26 |

* cited by examiner

Primary Examiner—Alpus H. Hsu
Assistant Examiner—Toan D. Nguyen

(57) ABSTRACT

A method a system of identifying and determining degradation of the quality of service (QoS) perceived by a subscriber in a network such as the Internet. Traffic of individual applications of the subscriber and aggregate traffic of a subscriber are monitored, captured, and processed to produce QoS statistics. End-to-end QoS metrics are provided for TCP connections based on the observation of packet flows at a single monitoring point. The QoS metrics include, for example, packet loss internally and externally to the monitoring point, detection of stalled periods and estimation of path delay.

16 Claims, 13 Drawing Sheets

SCALABLE REAL-TIME QUALITY OF SERVICE MONITORING AND ANALYSIS OF SERVICE DEPENDENT SUBSCRIBER SATISFACTION IN IP NETWORKS

BACKGROUND

The present invention pertains to systems and methods for monitoring and determining the quality of service (QoS) in a network. More particularly, the present invention provides QoS metrics including internal and external packet loss, the detection of stalled periods, and path delay estimates.

Most current network monitoring and analysis methods can be categorized into two groups depending upon where the monitoring is performed. The first category involves monitoring the performance of the IP network on a network level, where an Internet Protocol (IP) is defined to be the method or protocol by which data is sent from one computer to another on the Internet. Network level monitoring is performed by public and enterprise networks. The second category, which involves monitoring the subscriber access performance, is characterized by Service Level Agreement (SLA) monitoring.

Network level monitoring is usually done by the network operator and typically includes simple statistics, e.g., event counters on router interfaces for the amount of incoming and outgoing packets, bytes and number of lost packets. One of the most important aims of network level monitoring is to identify badly performing network elements and network congestion. On the other hand, SLA monitoring is usually performed by the subscriber to test whether the SLA is being kept by the network service provider. SLA monitoring typically involves information about the amount of traffic passing the access link, the Grade of Service (GoS) of the access link, and Quality of Service (QoS) of the access link, e.g., frame errors, bit error rate, downtime. The access link may be thought of as a selectable connection linking a subscriber from one word, picture, or information object to another.

A recent trend among IP service providers is to offer "finer grained" services to subscribers. For example, service providers offer finer grained services having different levels of TCP/IP service. The offered service can be loosely defined, as the case of Differentiated Services Networks (DSN), which provide a protocol for specifying and controlling network traffic by class so that certain types of traffic get precedence. The different levels are differentiated by a combination of access data rate (either guaranteed or average), guaranteed maximum or average packet delay (e.g., less than 100 ms), guaranteed maximum packet loss in the network (e.g., less than 1%). At present, only the so-called "best-effort" service is generally offered, which guarantees none of the above. But if, for example, the provider wants to enable voice or video, (as in UMTS), then there will be a need for these "better than best-effort" services, otherwise the quality would be unacceptable.

As an alternative to DSN, the offered service may be very rigid, such as in networks offering voice over IP (VOIP) or other interactive real-time services in which data delays are not tolerable. Due to developments such as these, the monitoring of subscriber perceived QoS, or user satisfaction, is gaining increasing importance for IP service providers.

Conventional monitoring methods used by network providers are not able to monitor the satisfaction for individual subscribers because traditional methods perform tests on large traffic aggregates which do not allow to estimate QoS for individual applications, e.g., WWW, File Transfer Protocol (FTP), voice over IP, streaming video or audio applications. Hence, it is not possible to accurately estimate the packet delay, delay variation, and loss rate of individual IP telephony conversations based on router interface statistics. On the other hand, different applications require different levels and types of packet service quality. Therefore, it may not always be necessary to monitor an individual subscriber's satisfaction for some applications.

In conventional circuit switched networks a simple network level measurement (e.g., average number of occupied circuits within a circuit group, or Call Blocking Probability) could be used very efficiently to calculate and engineer the GoS for the subscribers in a cost efficient way. In an IP network such analytic methods do not exist. Currently, Internet service providers (ISPs) generally apply a simple engineering rule-of-thumb based on one or more aggregate network level QoS measurements. For example, one rule-of-thumb could be: if the load or packet loss on a given link exceeds a certain level (e.g., 70%) in the busy hour, then the subscriber perceived QoS has probably degraded below the acceptable level, and so the link speed should be increased.

Such a rule-of-thumb approach can work well, and be economic, for large capacity links and in the case of best-effort services. In networks however, where economic considerations limit the possibility of overprovisioning (e.g., IP based mobile access networks), or if higher than best effort services are offered (e.g., voice over IP, DiffServ), it becomes desirable to have a better method for estimating the subscriber perceived QoS.

A number of conventional approaches have been used to obtain coarse estimates of user perceived QoS. Some examples of conventional approaches include NeTrueQOS, Concord, standards and drafts by the IP Performance Monitoring Working Group of the Internet Engineering Task Force (IPPM WG of the IETF), XIWT active network performance measurement architecture, and Ericsson Internet Network Monitor (INM).

A widely applied active method is based on active ping delay measurements. This is done by sending special Internet Control Message Protocol (ICMP) ECHO REQUEST (ping) IP packets to a host. When the host receives the packet, it answers the sender by a response packet within a very short time. By measuring the time it takes to receive the answer, the sending host can estimate the round-trip delay of the path between the two hosts. An advantage of ping is that the implementation of this method is not costly, since ping is available in all IP hosts and routers. Only the monitoring device has to be installed in accordance with the ping method. A related Ericsson product, INM, uses GPS synchronized clocks at network elements. A benefit of INM is that one-way delay can be measured.

Active methods tend to be disadvantageous in that they add significant extra load to the network. The main problem is that active delay measurements require considerable time and resources. In order to have a low variance test, an active delay measurement method would typically send hundreds of test packets. This drawback is exacerbated due to the fact that operators tend to be most interested in delays during the busy hours, when adding considerable extra load should be avoided. During low load periods, the extra loading is not as much of a concern. However, there is little interest in the delay during periods of low load.

Another type of convention approach involves active methods based on user emulation. Such methods uses active tests (e.g., test file downloads between two hosts, as a real user would do) and measures the throughput, loss and delay. This method is advantageous in that it is more efficient to approximate user satisfaction as the method emulates a user and the user's applications. Thus, the QoS of different applications can be more accurately estimated. One example of an active method based on user emulation is Micromuse/ Netcool, which can generate active tests for a number of important applications (e.g., Hypertext Transfer Protocol (HTTP), File Transfer Protocol (FTP), Lightweight Directory Access Protocol (LDAP), Remote Authentication Dial-In User Service (RADIUS), etc).

A disadvantage of active methods based on user emulation is that they require even more time compared to Ping. The continuous use of active user emulation would disadvantageously result in considerable additional load to the network. Moreover, the monitored services may not be the same as those service most frequently used by subscribers.

FIG. 1 depicts a conventional system of passive performance monitoring in which packets passing a probe are observed by the probe. The architecture for implementing a passive probe typically includes a passive network interface and a packet decoding process. For example, LIBCAP based tools (e.g., TCPDUMP) can be used to capture packets on the fly and decode protocol stacks on the fly. Then the conventional passive probe monitoring system produces several simple protocol-dependent statistics, e.g., protocol distributions. Examples of conventional passive probe approaches include CORAL, NIKSUN, LIBCAP, TCPDUMP, HP tools, network probes implementing IETF RMON 1-2, Sniffer, or RADCOM. Some of the conventional tools store the captured packets into a file, and perform more complex statistics off-line (e.g., RADCOM, CORAL, Sniffer).

A number of U.S. patents involve conventional passive probe methods. For example, U.S. Pat. No. 5,867,483 to Ennis, Jr., et al. describes a method for monitoring the access line throughput distributions over time, while displaying the data throughput levels (e.g. 10%, 20%) evolving in time. U.S. Pat. No. 4,775,973 to Tomberlin, et al. pertains to a method for gathering the amount of packets or bytes measured between end-hosts in a matrix format. Other conventional data analysis methods are presented in U.S. Pat. No. 5,251,152 to Notess, and in U.S. Pat. No. 5,446,874 to Waclawsky, et al. The common disadvantage of these methods is that they do not offer explicit information about the user perceived quality.

The general problem of conventional passive methods is that they can provide only very limited QoS statistics because of scalability limitations. More accurate user perceived QoS measures may be obtained by active methods. Another disadvantage of conventional passive monitoring tools is the requirement of placing network probes on every network element.

As a network wide monitoring system, conventional active monitoring methods would necessitate N*N tests periodically to gain end-to-end knowledge, where N is the number of network nodes (e.g., edge nodes) between which the end-to-end QoS measurement is made. Such an approach is not feasible for large networks having numerous routers and hosts. Due to this limitation, current active monitoring methods such as ping-based tools are generally only used for measurements between edge routers and a central host (monitoring host). This does not allow for precise end-to-end analysis from edge to edge.

The available real-time statistics from passive packet capturing probes tend to be fairly simple because, on large links, it is not possible to make statistics for each and every packet and user. For example, RADCOM can monitor very fast ATM links, but only on a per virtual channel (VC/VP) level.

Conventional systems are only able to perform more complex statistics off-line on previously captured and stored packet traces. For example, the "NIKSUN" tool can measure packet delay of a user chosen connection between two NIKSUN probes. This is done off-line, after correlating the packet capture logs of the distant probes. Furthermore, the NIKSUN method is seriously limited in the size of network that can be handled. (See WO 00/31963 published Jun. 2, 2000) Another method, "Packeteer, " is a packet shaper and analysis tool, all in one. As a packet shaper, it has attributes of being active as well as a passive analysis tool. The Packeteer tool classifies applications on the fly, and has a reserve service rate for mission critical flows. Passively collected statistics are available for these flows. However, this tool is only available for work only in enterprise networks, due to scalability limitations. Although both the NIKSUN and Packeteer tools offer flow related statistics, they do not offer user perceived and application dependent QoS measurements.

A disadvantage of current passive monitoring tools is the requirement for a network probe on every network element.

SUMMARY

The present invention, which pertains to systems and methods for monitoring and determining the quality of service (QoS) in a network, overcomes the disadvantages of conventional systems, including, for example, the disadvantageous requirement for a network probe on every network element. The architecture of the present invention enables operation with as few as one or two devices at key points of the network. Later, if needed, further devices may be installed to refine or expand the system, in accordance with the present invention.

The present invention is advantageous in that it does not load the network since it involves a passive method. On the other hand, the present invention also advantageously delivers a similar quality and detail of statistics as could be achieved through use of an active method.

Instead of relying upon simple aggregate protocol statistics as per the conventional methods, the present invention performs sophisticated service dependent analyses to gain a reliable picture about the QoS perceived by subscribers. By "service dependent analysis" it is meant that different applications delivering different services require specific measurements. For example, an FTP or WWW service is not sensitive to packet delays, but it is very sensitive to, for example, request-response times, aborted connections, stalled or congested periods, Domain Name look-up delays. One embodiment of a service dependent analysis in accordance with the present invention is the TEA analysis especially suited for FTP and WWW services. Another example of a service dependent analysis is RTP analysis. RTP is the protocol used for real-time conversations (e.g., voice). For traffic flows using RTP, it is important to know what is the delay, delay variance, and also if the packet loss is below the acceptable level.

The method of the present invention provides QoS metrics for TCP based applications, (e.g., packet losses, throughput efficiency). Analysis methods are presented to gain measures about true user perceived QoS. The measures also identify whether the problem originates in the inner or the outer network side. Instead of trying to capture each and every packet, a representative large subset of subscribers (e.g. 10,000 subscribers at a time) is monitored. In this way, the present invention is able to maintain scalability for very high speeds.

The present method can be efficiently used in networks consisting of hundreds, or more, of routers and large subscriber populations where placement of monitors in all routers is not economic. One example of such networks is mobile Internet services (e.g., GPRS, UMTS). The present invention can be best used when high aggregations of subscriber traffic are present and when monitoring the user perceived QoS is important for the network operator. Examples include IP access networks such as IP based radio access networks (e.g., GPRS, UMTS, BSS-IP). An advantage of the proposed method is that it scales well, and one device may be enough for implementation at start-up. As the network grows and more detailed information is needed, more devices can be installed.

In accordance with the exemplary embodiments of the present invention, subscribers who are currently using a particular service are sought out and focused upon in order to monitor the QoS of the service, instead of initiating conventional active measurements. Not all packets are monitored, since this would be impossible on large links. Rather, a representative subset of subscribers is chosen for monitoring. For these representative subscribers, sophisticated QoS analyses are done. In accordance with a further embodiment, the monitored subset gradually changes over time, so as to remain representative of the population of active subscribers which may change with time.

A passive monitoring architecture of the present invention enables the realtime analysis of large numbers of users in parallel, and in a scalable way. Because of the scalable architecture, it is possible to install monitors at relatively high aggregation points of the network. Thus, a large network of hundreds or more routers can be covered using a few devices or even one device [e.g., place it near the GGSN in the General Packet Radio Service (GPRS)].

Subscriber traffic is analyzed, taking into account the consideration that a subscriber may simultaneously use different applications in some instances, and therefore perceive different QoS for the different applications. Another factor which is considered is that applications running in parallel may disturb each other. The subscriber QoS is thus in connection with the QoS of the individual applications which may be active at the same time.

The present invention is capable of identifying, for example, whether a degradation of QoS is caused by the subscriber having too many Web pages open, or whether the problem exists in the network. This is done by monitoring the traffic not only of individual applications, but also by maintaining a subscriber traffic record containing statistics of the aggregate traffic of a subscriber.

In accordance with an exemplary embodiment of the present invention, a method is provided for end-to-end QoS metrics for TCP connections based on the observation of packet flows at a single monitoring point. These QoS metrics include, for example, packet loss internally and externally to the monitoring point, detection of stalled periods and estimation of path delay.

For streaming and real-time applications delay variation and packet loss are estimated for the paths between the monitoring point and the end-hosts. The result of the analyses may identify the source of a problem. In this way the present invention may answer the question of whether the source of a problem is inside the managed network or outside in another ISP's area, for example.

A method is presented for monitoring the efficiency of meeting the subscriber SLA. The method, called Throughput Efficiency Analysis (TEA), can be used to detect SLA problems far from the actual access point for thousands of subscribers in parallel. Graphical methods to support the use of Throughput Efficiency Analysis are presented, which include, distribution of subscriber TEA, evaluation of internal/external network TEA.

Exemplary embodiments of the present invention are drawn to method of monitoring subscriber QoS in a network. In accordance with one exemplary embodiment, a monitor is installed in the network to be in communication with inbound and outbound traffic. The monitor may be, for example, a probe in the network, or, more specifically, a passive network interface. A representative subset of subscribers to be monitored is then selected, for example, by applying inbound and outbound traffic to a filtering function. Packet data received at the monitor is preprocessed to identify and store the accepted packet which is from the subscribers being monitored, that is, the subscribers which belong to the representative subset. Finally, a microflow record may be provided which includes statistics corresponding to the subscriber QoS of the network. The microflow record may include values for a subscriber IP address, a destination IP address, a subscriber port, and a destination port.

In accordance with one exemplary embodiment, the filtering function may be a mixing function in which a subscriber IP address is shifted to produce a shifted subscriber IP address. The shifted subscriber IP address is then compared with a value proportional to a tuning parameter.

In accordance with another exemplary aspect of the present invention, a subscriber traffic record of all applications running for a particular subscriber may be maintained. In this way, a source of QoS degradation for a particular subscriber based upon said subscriber traffic record may be determined.

List of Acronyms

ACK: acknowledgment packets
ATM: Asynchronous Transfer Mode
DNS: Domain Name Service
DSN: Differentiated Services Networks
FIN: A bit indicating the last packet in a successful TCP connection
FTP: File Transfer Protocol
GGSN: GPRS Gateway Support Node; A router node in a GPRS network
GPRS: General Packet Radio Service
GPS: Global Positioning System
GoS: Grade of Service
HTTP: Hypertext Transfer Protocol
ICMP: Internet Control Message Protocol
IETF: Internet Engineering Task Force
IPPM WG: IP Performance Monitoring Working Group— An IETF working group developing standards for performance monitoring for the Internet.
INM: Internet Network Monitor
IP: Internet protocol
ISPs: Internet service providers
LAN: Local area network.
LDAP: Lightweight Directory Access Protocol
QoS: Quality of Service
RADIUS: Remote Authentication Dial-In User Service
RST: TCP Reset.
RTCP: Real Time Control Protocol RTP: Real-time Transport Protocol
SLA: Service Level Agreement
TCP: Transmission Control Protocol
TCP/IP: Transmission Control Protocol/Internet Protocol
TEA: Throughput Efficiency Analysis
UDP: User Datagram Protocol
VC/VP: Virtual Channel/Virtual Path
VOIP: Voice Over IP
WWW: World Wide Web
XIWT: Cross Industry Working Team; One working group of XIWT addresses problems related to Internet performance analysis.

BRIEF DESCRIPTION OF THE DRAWINGS

These, and other objects, features and advantages of the present invention will become more readily apparent to those skilled in the art upon reading the following detailed description, in conjunction with the appended drawings, in which.

DETAILED DESCRIPTION

These and other aspects of the invention will now be described in greater detail in connection with a number of exemplary embodiments. To facilitate an understanding of the invention, many aspects of the invention are described in terms of sequences of actions to be performed by elements of a computer system, or as functional blocks. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Figure 1:
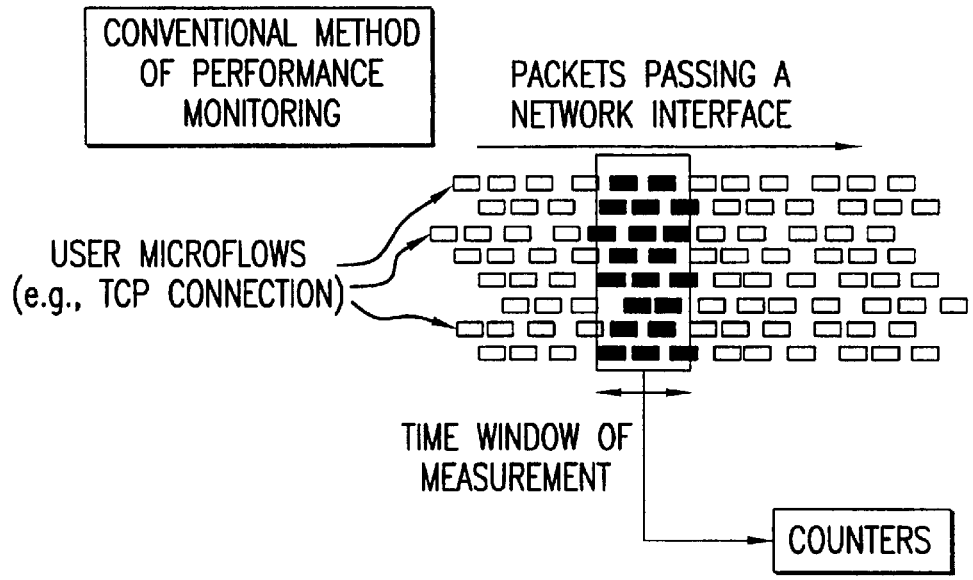
FIG. 1 depicts a conventional system of passive performance monitoring in which packets passing a probe are observed by the probe.
Figure 2:
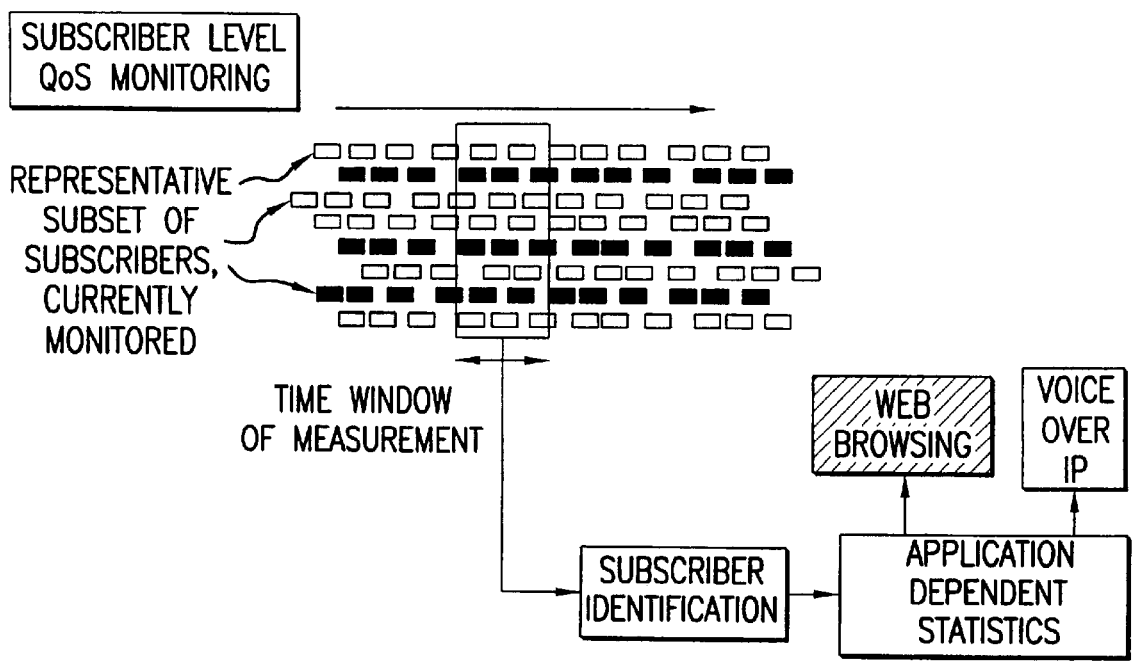
FIG. 2 depicts a system employing a passive monitoring architecture, in accordance with the present invention.

FIG. 2 depicts a system employing a passive monitoring architecture, in accordance with the present invention. As shown in the figure, a subset of subscribers is chosen for monitoring. In this disclosure, a "subscriber" is defined as any user or entity accessing data on a network. A "subscriber" does not necessarily, but may, pay a fee for access. Not all packets of all subscribers are monitored, since this would become impracticable, especially for large links. Therefore, QoS analyses are done for the representative subscribers. This enables a monitoring system which is a scalable for real-time analysis of a large number of subscribers. To preserve monitoring accuracy, the representative subset may be varied as time passes in order to maintain a correlation with the set of active subscribers which may changes with time. A means of determining whether or not a subscriber is to be monitored, such as use of a well-mixing hashing function or like means, is used to generate and maintain the representative subset of subscribers.

The well-mixing hashing function based on the IP address of the subscriber decides whether the subscriber is to be monitored or not. In a preferred embodiment, a subscriber will only be monitored if there is an empty record in the hash table, that is, a record not yet occupied by an other subscriber. When a record frees up after a timeout (e.g., the subscriber is idle for T minutes), then, the record can be occupied by a new subscriber. The well-mixing hashing function randomizes the subscriber addresses, such that the resulting numbers are highly uncorrelated with the originally subscriber IP address. In this way, any kind of filtering will choose an uncorrelated random subset.

Figure 3:
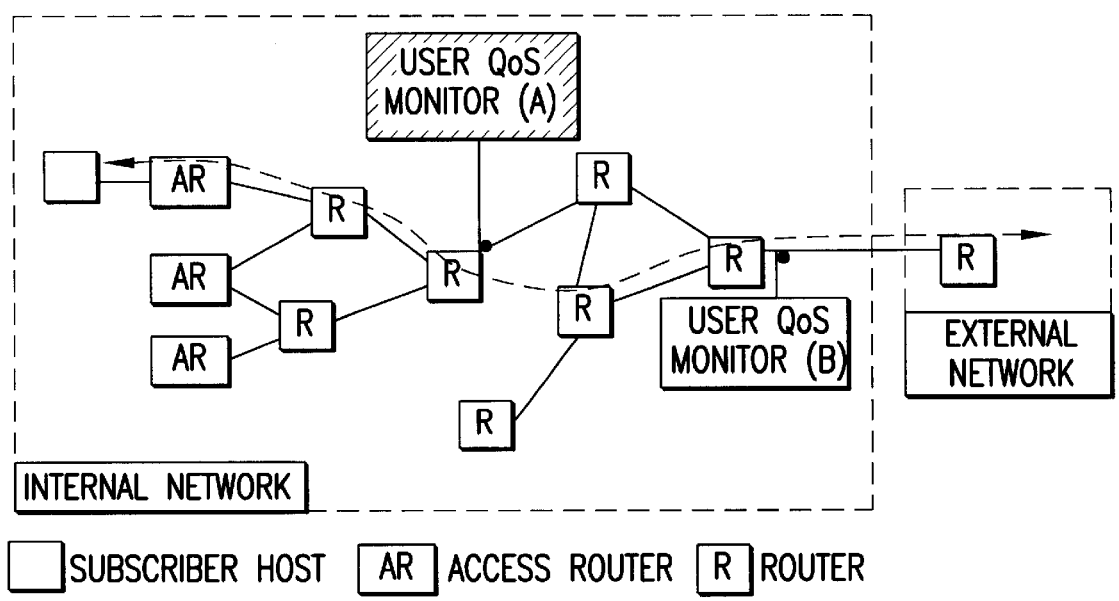
FIG. 3 depicts an exemplary monitoring system with two typical monitoring points, in accordance with the present invention.

FIG. 3 depicts an exemplary monitoring system with two typical monitoring points, in accordance with the present invention. The monitoring system may be characterized as operating in a stand-alone way, in that it automatically monitors subscriber traffic passing by a monitoring point. Monitoring points can be located at junctures of high aggregation where there are potentially a lot of data flows passing. FIG. 3 depicts two typical monitoring points, for illustrative purposes. Monitor A is shown at an internal aggregation point. Monitor B is shown at the border router so as to monitor all incoming and outgoing connections to and from the external IP network. The monitors, as shown in FIG. 3, are defined to be probes or other means or processes for monitoring subscriber traffic passing by a monitoring point.

Figure 4:
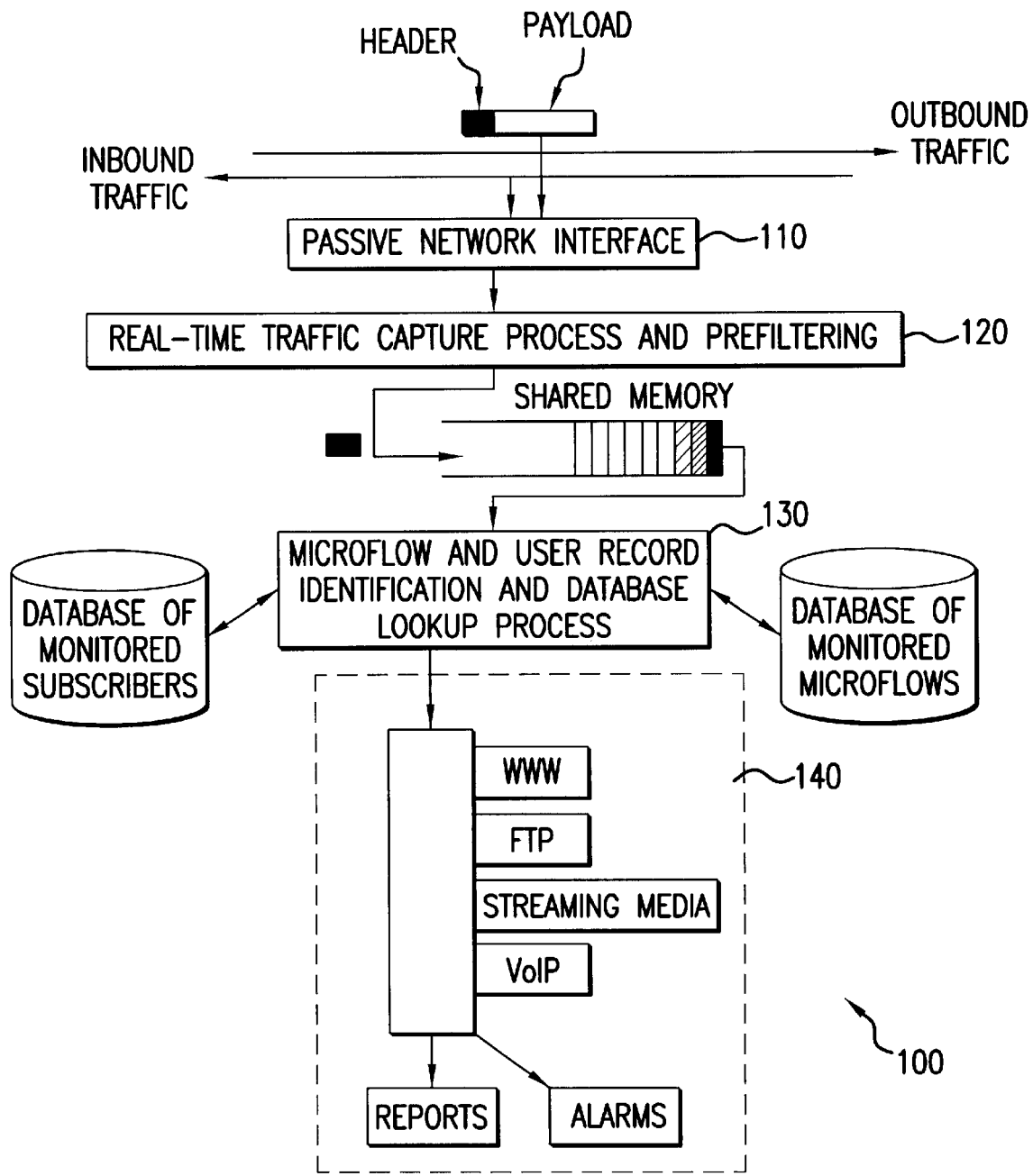
FIG. 4 depicts an exemplary system architecture 100, in accordance with the present invention.

FIG. 4 depicts an exemplary system architecture 100, in accordance with the present invention. The system architecture 100 includes a passive network interface section 110, a real-time traffic capture process and subscriber prefiltering process 120, a near-real-time microflow and subscriber identification process 130, and application dependent statistics modules 140.

As in the figure, the passive network interface section 110 is in communication with inbound and outbound traffic of a running network. The passive network interface section 110 is linked to the real-time traffic capture process and subscriber prefiltering process 120 which is linked to the near-real-time microflow and subscriber identification process 130, which, in turn, is linked to the application dependent statistics modules 140.

The passive network interface section 110 is typically a generic network interface, or passive probe, which is connected to a running network. The types of running networks, with which the present invention may be used, include the Internet, intranets, LANs, WANs, or like type of TCP/IP networks or systems for communicating data or signals between two points. In accordance with preferred embodiments of the present invention, both incoming and outgoing traffic are passed to the passive network interface section 110. The system of the present invention does not depend on a particular type of physical interface. A nonexhaustive list of a few exemplary types of interfaces for the passive network interface section 110 includes: optical splitters, passive serial line connectors, interface mirroring devices or systems supported by the router or switch, passive interfaces on a broadcast LAN, or like monitoring devices.

The real-time traffic capture and prefiltering process 120 captures the packets passing the monitor and cuts, or copies, a portion of the packet data (e.g., the first few dozen bytes) of each packet containing the protocol header fields, [e.g., Internet protocol (IP), Transmission Control Protocol (TCP), User Datagram Protocol (UDP), Real-time Transport Protocol (RTP)] and stores it in a data record. In this way, the process 120 accepts packet data pertaining identification and transmission statistics of the packet. In one embodiment, the process 120 passes the record to a shared memory buffer without further processing. Since only minimal processing is done at this stage, this task can be done in real-time, and no packets are lost even on high speed links. Alternatively, the real-time traffic capture and prefiltering process 120 can be configured to perform further processing of the captured record.

Some situations result in a very fast link, such as the situation in which the monitor is placed at a very high aggregation point, for example. In the case of very fast links, subscriber prefiltering may be done to further reduce the amount of packets to be processed. One factor affecting the scalablity of the architecture of the present invention depends upon monitoring a representative subset of a size large enough to accurately reflect all packets passing the point. Such sampling may be thought of as being similar in nature to the sampling performed during an exit poll survey after a presidential election. One aspect of the present invention is that the QoS analysis functions of the monitoring system scale up to the population of the chosen subset, and not the link speed or network size.

In accordance with a preferred embodiment of the present invention, the prefiltering function of the real-time traffic capture and prefiltering process 120 classifies all packets to two subsets. That is, packets are classified as those belonging to the subset currently being monitored and those which do not belong to the set of currently monitored subscribers. In accordance with this embodiment, all packets of all connections belonging to a subscriber in the monitored subset are preferably correctly identified by the filtering function. The proposed filtering function can be tuned very easily to filter out a certain percentage of subscribers in real-time. In this way, the amount of packets can be adjusted to the speed of the network and the capabilities of the monitoring device hardware.

The filtering function ensures that the chosen subset is representative of all subscriber groups using different services and all network areas according, to their population. An exemplary embodiment of the filtering function has two arguments:

$$F(\text{subs\_addr},p) = 1 \text{ or } 0 \tag{1}$$

In this relationship of the filtering function, the variable subs_addr is the IP address of the subscriber host, and p is the filtering ratio (e.g., p=0.1 means that 10% of the subscribers should belong to the analyzed subset). The result of the filtering function indicates either that the subscriber is in the representative set [F(subs_addr,p)=1] or not [F(subs_addr,p)=0].

The address space, e.g., the IP address space, is preferably a hierarchical structure, which not only identifies a host, but also identifies its whereabouts. Thus, close addresses are usually close in the network structure, but not necessarily close with respect to geographical proximity. A purpose of the prefiltering method is to ensure that neither bias nor preference are given to any subscriber group, i.e., that F is mixing well in the address space.

Figure 5A:
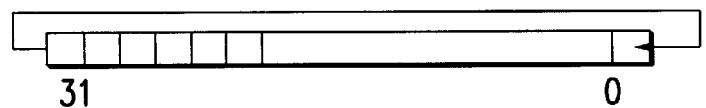
FIGS. 5A and 5B depicts a mixing function consisting of two steps, in accordance with a preferred embodiment of the present invention.
Figure 5B:
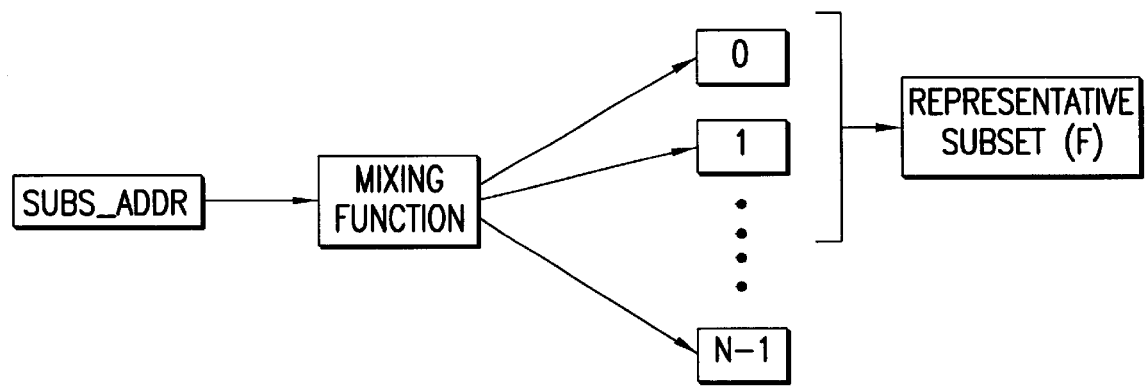

FIGS. 5A and 5B depicts a mixing function consisting of two steps, in accordance with a preferred embodiment of the present invention. First, place close-by addresses far from each other, as depicted in FIG. 5A. This may be done by circularity shifting the 32 bit IP address of the subscriber a number k times. The value of k can be tuned for different subscriber populations to allow neighboring addresses to get to a distance of about $2^k$ (2 to the kth degree). Second, consider the shifted IP address as one 32 bit unsigned integer number, and calculate the remainder of this number and N, as depicted in FIG. 5B. The result is a number between 0 and N given by the following relationship:

$$I(\text{subs\_addr}, N) = \text{mod}(\text{subs\_addr}, N) \tag{2}$$

The mixing function I is used for classification in the following way:

$$F(\text{subs addr},P) = 1 \text{ if } I(\text{subs\_addr},N) \leq N \times P, \text{ or } 0 \text{ otherwise} \tag{3}$$

In accordance with one embodiment of the present invention, following the arrival of a packet, the subscriber IP address is shifted and a modulo operation is done. Based on the resulting value, the evaluation whether the packet belongs to the monitored subset is done by a comparison with a value proportional to a tuning parameters. The product N×P equals to the maximum number of active subscribers in the monitored subset. The near-real-time microflow and subscriber identification process 130 reads the shared memory fed by the capturing process, identifying and looking up the subscriber and microflow records in the respective databases.

A microflow record stores real-time statistics about each individual traffic stream (e.g., TCP, UDP, RTP) in both directions, containing subscriber, protocol and service dependent information about the microflow. Typically, a microflow record is uniquely identified by values for a subscriber IP address, a destination IP address (i.e., the address of the host to which the subscriber is connected), a subscriber port, and a destination port.

A userflow record contains aggregate statistics of all conversations of a single subscriber. A microflow record contains statistics about a single conversation between two applications residing at the server and the subscriber. For instance, every Web page download is a microflow, or every voice conversation is a microflow. An exemplary embodiment of a microflow record contains: identification fields (IP addresses, port numbers); generic service independent statistics (number of packets, bytes, in/out); and service dependent statistics. For Web applications the service dependent statistics can, for example, consist of: average download throughput; number of stalled periods; packet loss rates; packet delays; server request-response delay; and/or how the conversation was closed (normally, time-out, abort). For voice/streaming applications the service dependent statistics can, for example, consist of: delay, delay variation; packet loss rate; and/or number of errored seconds. For DNS service the service dependent statistics can, for example, consist of: success/failure of name request; delay in response.

The microflow statistics are stored in records for further analysis. In a preferred embodiment microflow statistics are created real-time, when stored to disk when conversations end. A number of off-line analysis tools can parse these records as they are created and can correlate them to find out performance degradations around certain geographical areas and so on.

When a packet is read from the shared memory, based on the IP packet header a microflow record is created, or if it already exists, it is looked up in the database and tile reference to tile database record is returned.

An Internet service (e.g., FTP, WWW, RealMedia) may use several such microflows during its operation. For example, one microflow may contain data packets of an FTP file download, while an other microflow contains control data for the FTP session. An exemplary format of a microflow record in accordance with one embodiment, contains all running statistics for the microflow. The statistics depend on the service that the microflow belongs to. Identification of the service may be done in any of several ways (e.g., FTP may be identified by Destination Port 20 and 21, while WWW by ports 80 or 8080). The method of identification can be configured by the subscriber.

In accordance with one exemplary embodiment, the microflow record can be terminated in two ways. If the microflow record is for a TCP flow, a FIN or an RST packet, the record may be terminated. Otherwise a timer may be used to terminate the microflow record, the timer being set to a value larger than the maximum expected time between two packets belonging to one connection (e.g, about 10 minutes). After termination, the microflow and its application dependent statistics are logged, or saved, for further analysis. That is, a condensed statistics record is stored for every microflow, This condensed statistics record can be used to make off-line statistics, graphs, charts.

In accordance with exemplary embodiments of the present invention, a subscriber flow may be identified through use of only the Subscriber IP address. The Subscriber IP address preferably contains all running global statistics belonging to an active subscriber within the representative subset.

When a packet is read from the shared memory, a subscriber flow record may either be created, or looked up if it already exists, together with the microflow record. To save lookup time the subscriber flow record identifier is cached in the microflow record. Thus, lookup need be done only once for each new microflow.

In accordance with a preferred embodiment, the relation between a subscriber flow and a microflow is such that there is only one subscriber flow record for an active subscriber at any time, while there may be numerous microflow records for an active subscriber. For example, several WWW (HTTP) requests may be served in parallel and also several services may be running at the same time by the same subscriber.

A subscriber flow record may be terminated upon the expiration of a timer configured for such a purpose. This is useful in the event that no packet arrives from the subscriber host for a long time. In this instance, the timer may be set to a predetermined timeout value to terminate the subscriber flow record. The timeout value may be the same as for the microflow record, or alternatively may be tailored to suit system or subscriber requirements. After or upon termination, the subscriber flow record statistics are logged for further analysis.

The lookup process tends to require more time than packet capture. Since it requires more time, the lookup process does not lend itself to performance in real-time. Consequently temporary backlogs may accumulate in the shared memory. For this reason, it is the average packet count by time unit that limits the capacity of this task, and not the maximum speed of the physical medium.

When a packet header record is read from the shared memory, a hashing function is used to find the appropriate microflow record for the packet. An exemplary manner for achieving this may be realized through the following two steps.

First, an initial database key is generated. In accordance with one embodiment, the initial database key for the microflow database can be:

$$Id_{microflow}=\text{mod}(\text{subs-addr}+\text{dest-addr}+\text{subs\_port}+\text{dest\_port}, S_{microflow}). \quad (4)$$

In the foregoing exemplary embodiment of an initial database key $ID_{microflow}=\text{mod}$, the variable $S_{microflow}$ is the size of the microflow database counted in records, subs-addr and dest-addr are handled as unsigned 32 bit integers, and subs_port and dest-Port are handled as 16 bit unsigned integer numbers. For the subscriber flow database, the key is only the subscriber address: $ID_{subscriber\ flow}=\text{mod}(\text{subs\_addr}, S_{subscriber\ flow})$, where $S_{subscriber\ flow}$ is the size of the subscriber flow database counted in records.

Second, if the record in the database pointed by the ID is occupied by a different flow, then further search may be required. A next guess may be done by, for example, increasing the ID circularly:

$$ID=\text{mod}(ID+1,S) \quad (5)$$

This is typically done the same way for both microflow and subscriber flow databases. Step 2 is preferably repeated until the correct record is found, or until a given number of tries has been performed. In the latter case, upon reaching a predetermined number of tries, the search is aborted and the flow will be handled as if it belonged to the not monitored subset.

A preferred embodiment of the application dependent statistics modules 140 of FIG. 4 operates as follows. First, the application dependent statistics modules 140 determines whether the packet belongs to a specific service, and performs the appropriate special statistics. When the two records (microflow and subscriber) are found based on the type of protocol and application, the appropriate near-real-time application dependent statistics calculation functions are called. QoS analysis may be done depending on the service used by the subscriber. In accordance with alternative embodiments, for certain services, alarm events may be forwarded to a network management system if given thresholds are reached.

Figure 6A:
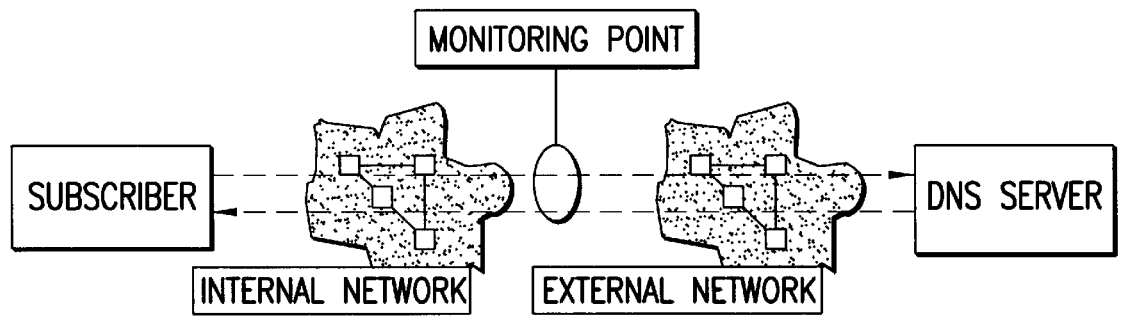
FIG. 6A depicts a subscriber connected to a Domain Name Service (DNS) server via a network in which there is a monitoring point in accordance with the present invention.

FIG. 6A depicts a subscriber connected to a Domain Name Service (DNS) server via a network in which there is a monitoring point in accordance with the present invention. The network is characterized as an internal network on the subscriber side of the monitoring point, and an external network on the DNS side of the monitoring point. DNS servers are typically responsible for converting domain names to an IP address. To connect a subscriber to a host, the associated IP address of the host must be referenced. For example, nearly all Internet services (e.g. WWW, FTP) start with a DNS request. In a highly congested network it is possible that long response times, and thus low QoS, are due to delayed DNS responses.

When a DNS request arrives from the managed network area, the device creates a microflow record storing the addresses of the subscriber and the DNS server together with the time when the request was captured. The microflow record is terminated when the response arrives from the DNS server. If no response arrives from the DNS server, the microflow record is terminated when the microflow record timer expires. After termination the DNS related statistics are logged. In exemplary embodiments of the present invention, DNS service measurement logs contain the DNS related statistics for the microflow, including the DNS server address, and, if the response is successful, a DNS response time. Otherwise the DNS service measurement logs contain an indication of failure if no response is received within an allotted time.

Figure 6B:
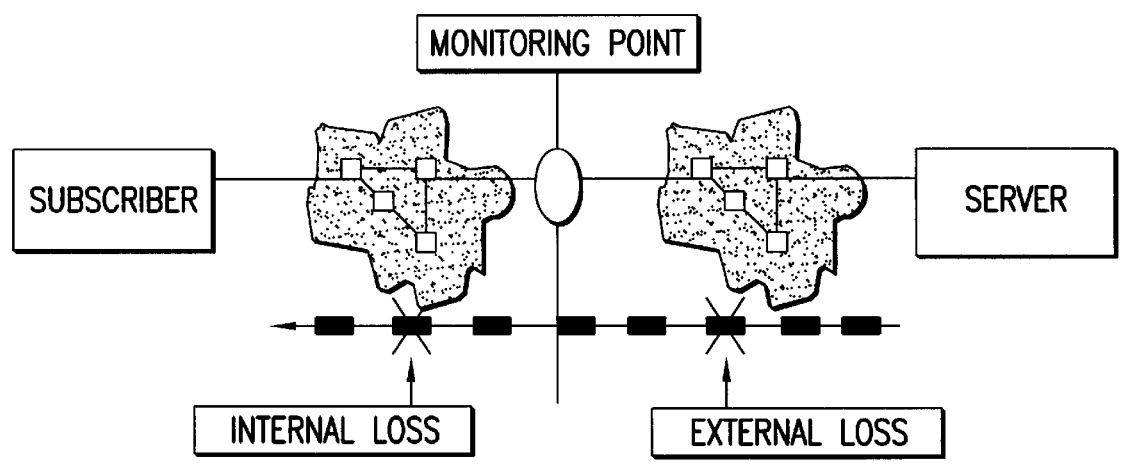
FIG. 6B depicts a subscriber connected to a Transmission Control Protocol (TCP) server via a network in which there is a monitoring point in accordance with the present invention.

FIG. 6B depicts a subscriber connected to a Transmission Control Protocol (TCP) server via a network in which there is a monitoring point in accordance with the present invention. TCP protocol may be used by many applications for reliable non-real-time data transfer. The applications using Transmission Control Protocol (TCP) include, e.g., WWW, FTP, and e-mail. For applications using TCP connections, the following statistics are collected in the microflow record: packet loss ratio for the connection internally and externally; estimation of the round-trip delay internally and externally; number of stalled periods for the connection; and end-host (server) response time.

Packet losses may be estimated internally or externally for TCP connections as shown in FIG. 6B. Internal losses may be experienced between the monitoring point and the subscriber. External losses may be experienced between the monitoring point and the TCP server. The present invention can estimate the ratio of packets lost on the end-to-end path based on the packet flow observed at one monitoring point. Packet loss ratios which are larger indicate worse end-to-end performance, while packet loss ratios which are smaller indicate better performance. Through use of the present invention, it may also be also be estimated whether a packet is lost between the monitoring point and the subscriber host (internally), or between the monitoring point and the server host (externally).

Figure 7:
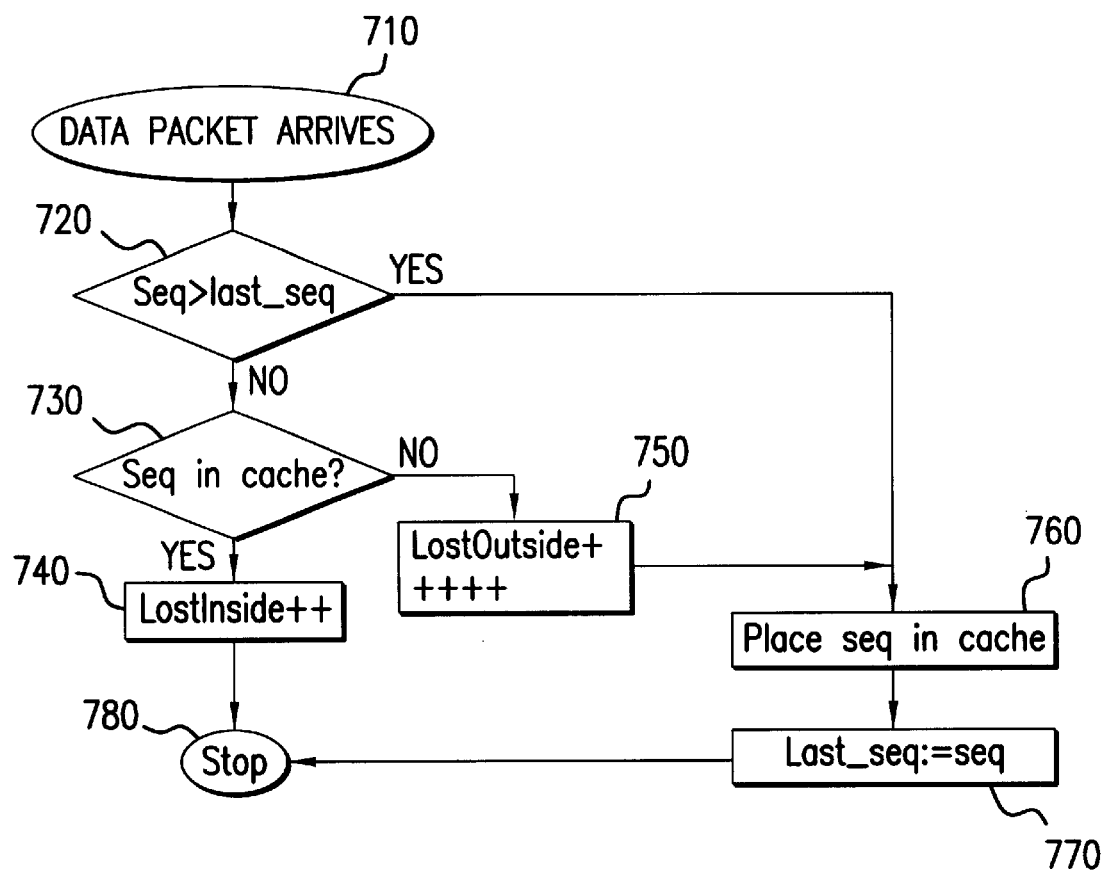
FIG. 7 depicts steps for ascertaining whether a packet is lost internally or externally, in accordance with the present invention.

FIG. 7 depicts steps for ascertaining whether a packet is lost internally or externally, in accordance with the present invention. For illustrative purposes, the explanation pertains to a typical situation in which a subscriber downloads a file, i.e. data packets travel from an external server towards the subscriber host.

In accordance with step 710 of this exemplary embodiment, the monitoring system caches those packets that are likely to be unacknowledged for the connection. Once the packet is stored in cache memory in step 710, the method proceeds to step 720 to determine whether the sequence of the present packet (Seq) is later (i.e., larger) that the sequence of the previously received packet (last_seq). In this way, it can be determined whether the packet has been received in sequence or out of sequence. If the packet is in sequence, that is, the sequence of the present packet is later that the sequence of the previously received packet, the method proceeds to step 760 in accordance with the "yes" branch from step 720. Upon storing the packet in cache memory in step 760, the method proceeds to step 770 where the variable last_seq is set to the sequence number of the packet, prior to ending the steps in step 780.

If it is determined in step 720 that a packet has arrived out of sequence (e.g., there typically is a gap between the stream of sequence numbers), the method proceeds along the "no" path from step 720 to step 730 to determine if the packet has already been stored in cache. If, in step 730, the packet has not been seen before at the monitoring point, the method proceeds along the "no" path from step 730 to step 750 which indicates a packet loss occurrence between the monitoring point and the server outside (outside loss). After step 750, the method proceeds to step 760 for storing the packet in cache memory, then to step 770 setting the variable last_seq to the packet sequence number, and finally ending at step 780.

An instance of the same packet being seen twice from upstream, generally means that there was a packet loss between the monitoring point and the subscriber terminal, that is, an inside loss. This situation is often detected by receiving a packet with the same sequence number as a previous, yet unacknowledged packet. If step 730 determines that the packet has been seen before at the monitoring point, the method proceeds along the "yes" path from step 730 to step 740, indicating that a packet loss occurrence between the monitoring point and the subscriber terminal (inside loss). If an acknowledgment arrives, all packets are removed from the cache up to the acknowledgment, as this packet will not be resent again.

This way the number of packets that has to be cached can be approximated by the TCP's congestion window (or receiver window in case of fast links). Since this typically entails relatively few packets, the packet lookup in the cache can be achieved very rapidly.

Figure 8A:
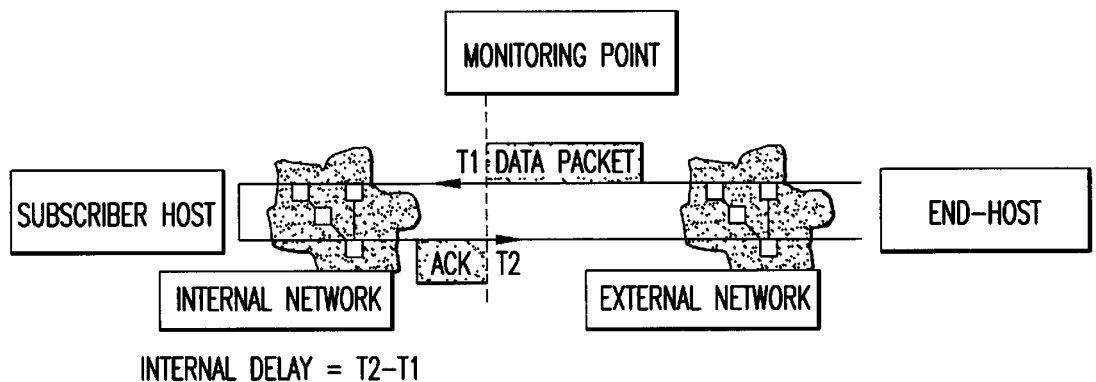
FIG. 8A depicts the estimation of internal packet delay.

FIG. 8A depicts the estimation of internal packet delay. A situation such as this would occur, for example, when a subscriber downloads a file. In the system of FIG. 8A, data packets travel from an external server towards the subscriber host, while acknowledgment packets (ACK) are sent upwards back to the server.

Internal packet delay can be estimated by the time required to receive an acknowledgment to a data packet. For this, the present invention make use of the cache memory disclosed above. Assuming that the subscriber host answers with an ACK within microseconds after it has received the packet, this time typically provides a relatively precise estimate of the delay accumulated in the internal area. However, not all packets are appropriate for use in delay measurement. For example, delayed acknowledgments and packet losses cause inaccuracy in the delay estimate, and should preferably be omitted from the calculation of average delays.

Figure 8B:
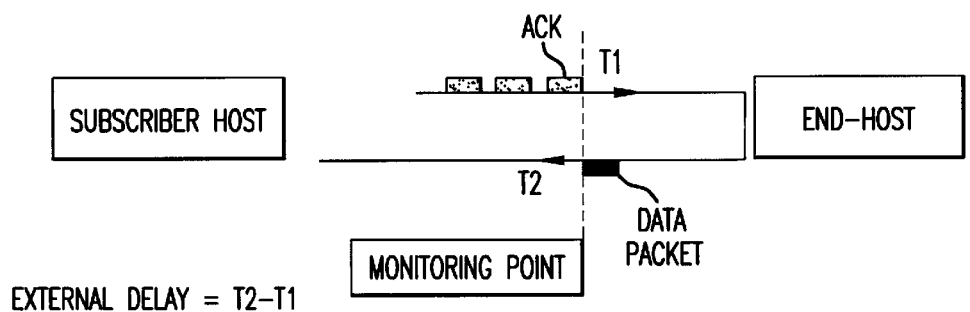
FIG. 8B depicts the estimation of external packet delay.

FIG. 8B depicts the estimation of external packet delay. In general, it is less efficient to determine external path delay due to the difficultly in identifying which packet was sent by the server when it receives an ACK signal. However, there are situations in which external path delay can be approximated in a fairly efficient manner. For example, when there is a longer idle period (last value of $T_2-T_1>T_{idle}$). Another situation for the efficient determination of external path delay occurs just after the connection is just been set up, i.e. the first packet arrives after the SYN packet. In these cases, it can be ensured that a packet is sent by the server right after it has received an ACK.

Stalled periods can be a very annoying phenomena for the subscribers. Stalled periods occur when several packets are lost in sequence. As a result, the time-out estimate of the TCP increases significantly, and there often is no effective data transfer during a considerable time period. An overly long stalled period may cause the entire connection to be aborted.

The number of stalled periods during the service can be detected by measuring the time between the current TCP packet and the last packet. If this time exceeds a time limit (e.g., 10 sec), a counter is incremented in the microflow record. For example, the variable stalled_periods could be incremented in such a counter to detect a stalled period.

Not all TCP connections can be used to calculate stalled periods. In general, only the TCP connections can be used that always have a packet waiting to be sent, that is, those TCP connections that are "greedy." An example of a non-greedy application is Telnet. Thus, the type of application should be identified. In accordance with the present invention, the counting of stalled periods is limited to greedy applications, such as, for example, HTTP 1.0, e-mail, FTP data, or other like greedy applications.

In many cases, when a server (e.g., Web server) gets congested it either refuses new connections, or has considerable delay in answering the connections. This delay appears very similar to DNS response delay from the subscriber's perspective. A method for calculating server response delay in accordance with the present invention is as follows. When a new TCP connection is requested, a SYN packet is sent by the client towards the server. This will be identified at the monitoring point as a new microflow and so a new microflow record is allocated. The timestamp of the SYN packet is stored in the record. The response time may be calculated by waiting to the server to respond with a SYNACK packet. The result is stored in the microflow record and will be logged when the microflow record is terminated, i.e. when the TCP connection terminates or times out.

Figure 8C:
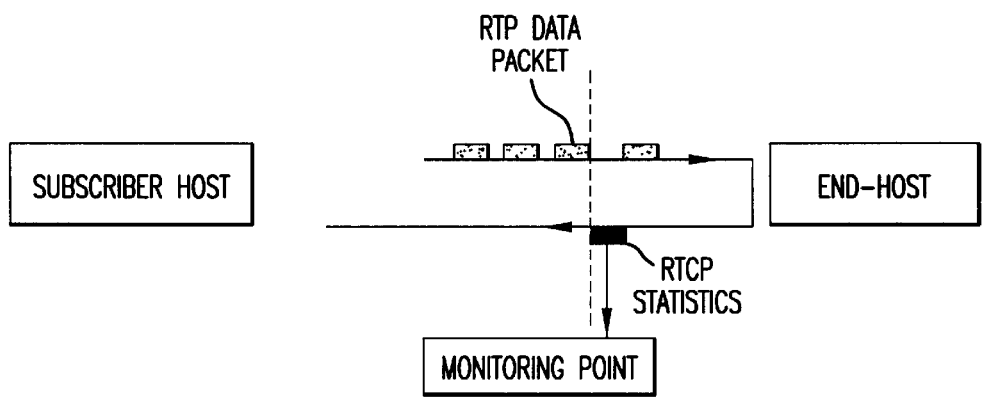
FIG. 8C depicts the collection of RTCP statistics in a system using the RTP protocol.

FIG. 8C depicts the collection of RTCP (Real Time Control Protocol) statistics in a system using the RTP protocol. The majority of real-time applications (e.g., video, voice) use the Real-time Transport Protocol (RTP) standardized by IETF. For real-time applications the subscriber perceived QoS measures are somewhat different from data applications. The most important QoS measures are generally considered to be delay, delay variation, and packet loss.

Typically, the RTP protocol includes an optional statistics reporting mechanism which measures the most important statistics and periodically sends back RTCP packets with these statistics. As these packets follow the same path as the RTP data packets, the monitoring device can directly read these measurements and store them in the micfroflow record.

In an instance when RTCP statistics are not implemented for the service, the statistics are preferably collected by the QoS monitoring system itself, in accordance with the present invention. For this process, the monitoring system acts as a virtual host for both end-hosts. The possible statistics to be collected include packet loss between the sender host and the monitoring point, and the delay variation between the sending host and the monitoring point.

Statistics for the path between the receiver and the monitoring point generally cannot be estimated if only RTCP statistics are available. RTP Packets contain a sequence number and a timestamp. The timestamp is typically created by the sender based on the sender's own clock. However, since the clocks are not synchronized, the absolute delays are not measured. Packet loss is simply measured by the number of missing packets. This, in turn, is most often detected by holes in the flow of packet sequence numbers.

Delay variation is calculated in the following way:

First, upon allocation of the microflow, set the variables in the following manner:

M1=0; M2=0; and n=0;

where M1=first moment, M2=second moment, and n=number of samples.

Second, upon packet arrival, recalculate in the following manner:

M1=M1+monitor-clock−packetimestamp

M2=M2+(monitor-clock−packet_timestamp)^2 n=n+1 where monitor-clock is the time at the monitoring point when the packet arrived and packet-timestamp is the timestamp stored in the packet.

Third, after the microflow ends (e.g., time out), the delay variance may be calculated as:

$$\mathrm{Var} = M2/n - (M1/n)^2 \qquad (6)$$

Figure 9:
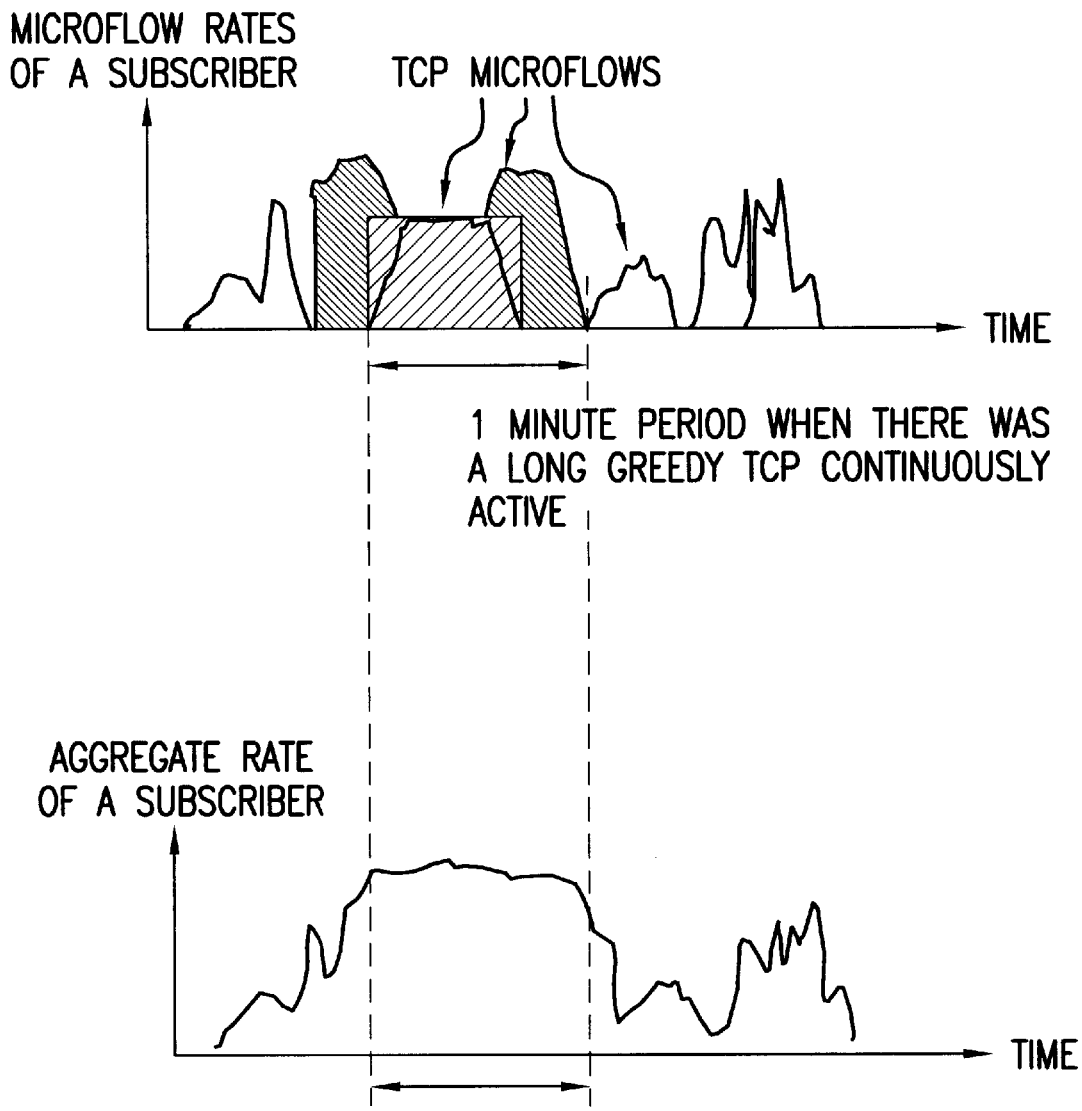
FIG. 9 is a TCP connection which has already settled down.

FIG. 9 is a TCP connection which has already settled down. The present method takes into consideration the premise that on the order of 90% of all data applications use TCP connections. TCP connections seek to send packets as fast as the network can handle the data, at a low packet loss ratio. The method of the present invention utilizes this feature of TCP, by adding together the traffic rate of all microflows of a given subscriber. If TCP congestion control works as expected, and there is at least one TCP active for a subscriber, the total sending rate of the subscriber is a direct indication of throughput efficiency. Unfortunately TCP congestion control is often not ideal, as it requires several round-trip times to settle down. The present method keeps track of subscriber flows, and searches for TCP connections which have already settled down, i.e. TCP connections alive for a sufficient time (e.g., 1 minute). For these subscribers the aggregated traffic rate is a relatively precise indication of the throughput efficiency.

Figure 10:
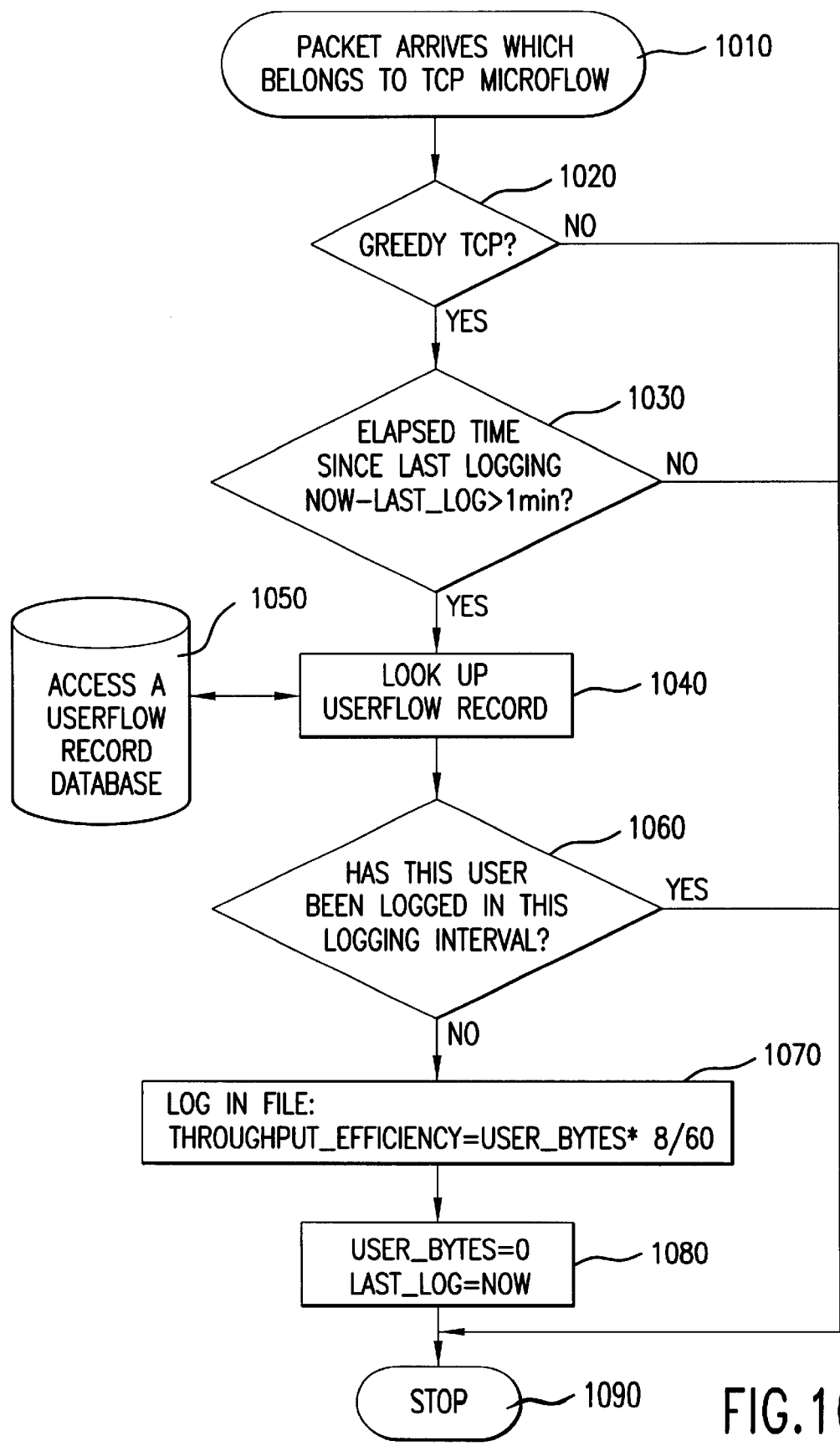
FIG. 10 depicts a method for Throughput Efficiency Analysis (TEA), in accordance with the present invention.

FIG. 10 depicts a method for Throughput Efficiency Analysis (TEA), in accordance with the present invention. Throughput efficiency may be thought of as testing whether the subscriber experiences the same or better network performance as it is defined in the SLA. Tests for real-time services SLA (e.g., delay) are generally monitored on a per-application basis, as disclosed above, but this is not necessarily the case for data. Throughput Efficiency Analysis provides a complete picture about the ability of the network to provide the throughput promised for the subscriber in the SLA. The figure depicts the algorithm that estimates the throughput efficiency of the subscriber. If the total throughput is below a certain level (e,g., 20 kbps) it means that the subscriber has experienced a low quality connection, and is probably not satisfied.

Upon the arrival of a TCP packet in step 1010 of FIG. 10, the microflow record is looked up. The method proceeds to step 1020 in which it is determined whether the TCP connection is greedy. In one embodiment, the packet is ignored in accordance with the "no" branch from step 1020, unless the microflow belongs to a application known to use greedy TCP flows. Alternatively, any like means of determining whether the TCP connection is greedy can be used in step 1020. If the TCP connection is greedy, the method proceeds to step 1030 in accordance with the "yes" branch from step 1020.

Step 1030 determines the elapsed time since last logging the TCP connection. If the elapsed time is less than a predetermined amount of time, the packet is ignored in accordance with the "no" branch from step 1030. The occurrence of a TCP connection that has lasted for a predetermined amount of time (e.g., one minute) is considered to mean that there was a constant need for the total capacity of the access. If the TCP connection has lasted for at least the predetermined amount of time, the method proceeds to step 1040 in which the subscriber flow record is looked up by accessing a subscriber flow record database in step 1050. The method then proceeds to step 1060.

In step 1060, if the subscriber flow record indicates that the subscriber has not been logged in during the predetermined interval, the method proceeds to the end in accordance with the "no" branch from step 1060. If, in step 1060, it is verified that the subscriber has been logged in during the logging interval, then the method proceeds to step 1070 in accordance with the "yes" branch from step 1060.

In step 1070, the subscriber's total throughput is calculated based upon information in the subscriber flow record from the subscriber flow record database and taking into account all services used by the subscriber during the predetermined time period. The calculated value is the throughput efficiency for the subscriber. The method proceeds to step 1080 to reset the subscriber bytes value to zero and the last log variable to the present time. The method ends in step 1090.

Figure 11A:
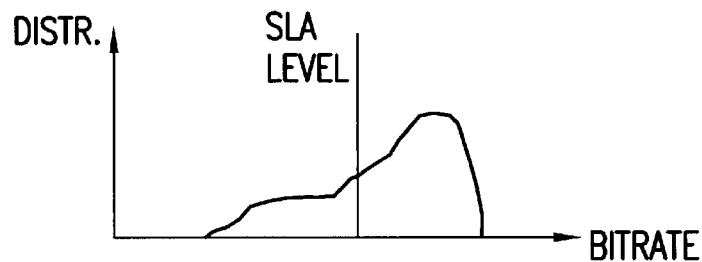
FIG. 11A is a method of displaying output information generated by the Throughput Efficiency Analysis (TEA)

FIG. 11A is a method of displaying output information generated by the TEA. An exemplary embodiment of the TEA generates logs containing a set of throughput measures from a number of subscribers in every logging interval (e.g., 1 minute). To evaluate the satisfaction of subscribers, the TEA information can be provided in the form of a histogram depicting the distribution of subscribers experiencing different levels of throughput efficiency.

Figure 11B:
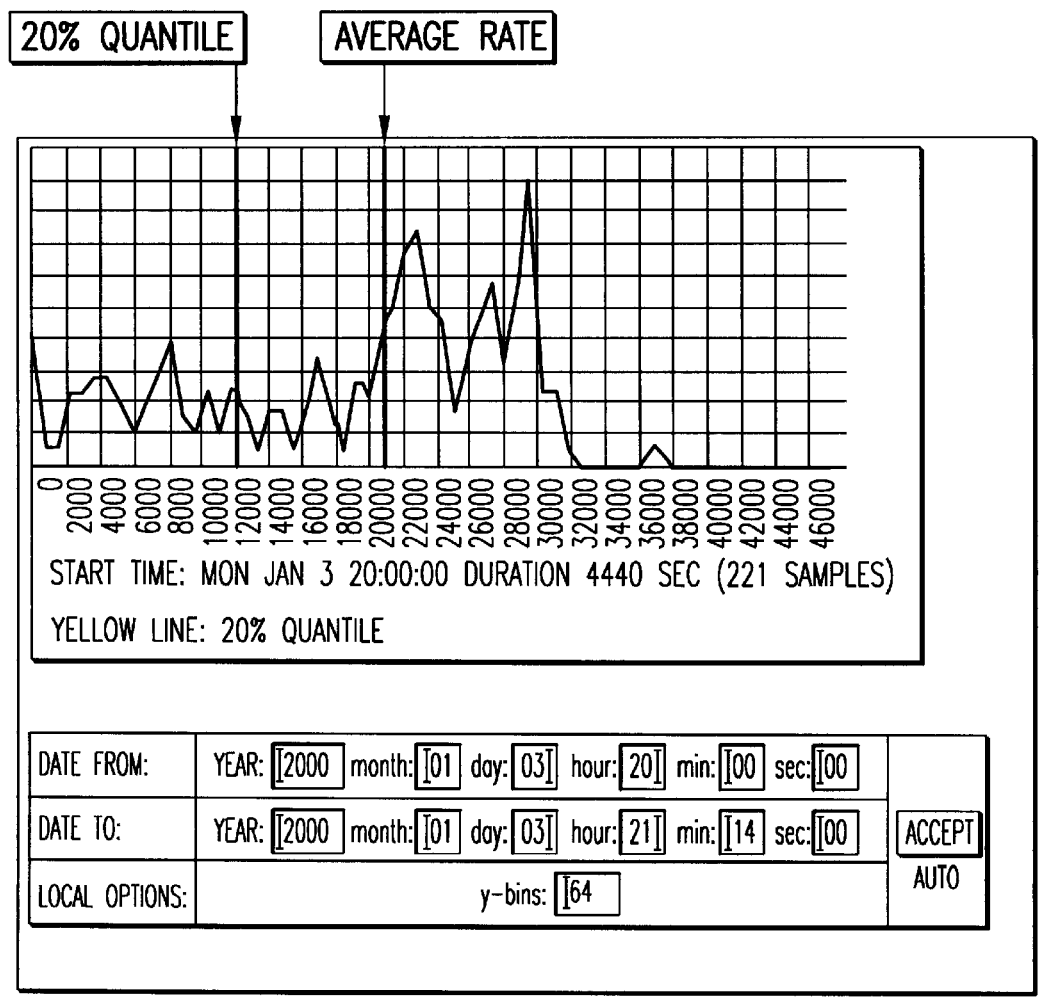
FIG. 11B illustrates an exemplary embodiment of the TEA information histogram.

FIG. 11B illustrates an exemplary embodiment of the TEA information histogram. The white line shows the throughput distribution histogram. In this example, the maximum value can be seen to be at 30 kbps, while the mass is concentrated above 20 kbps. The average is also shown by a line, and a 20% quantile is shown by another line. In this illustrative example, the subscribers were connected by 33 kbps modems, so the histogram shows that the access QoS was quite close to the modem access speed (implicit SLA).

Figure 12A:
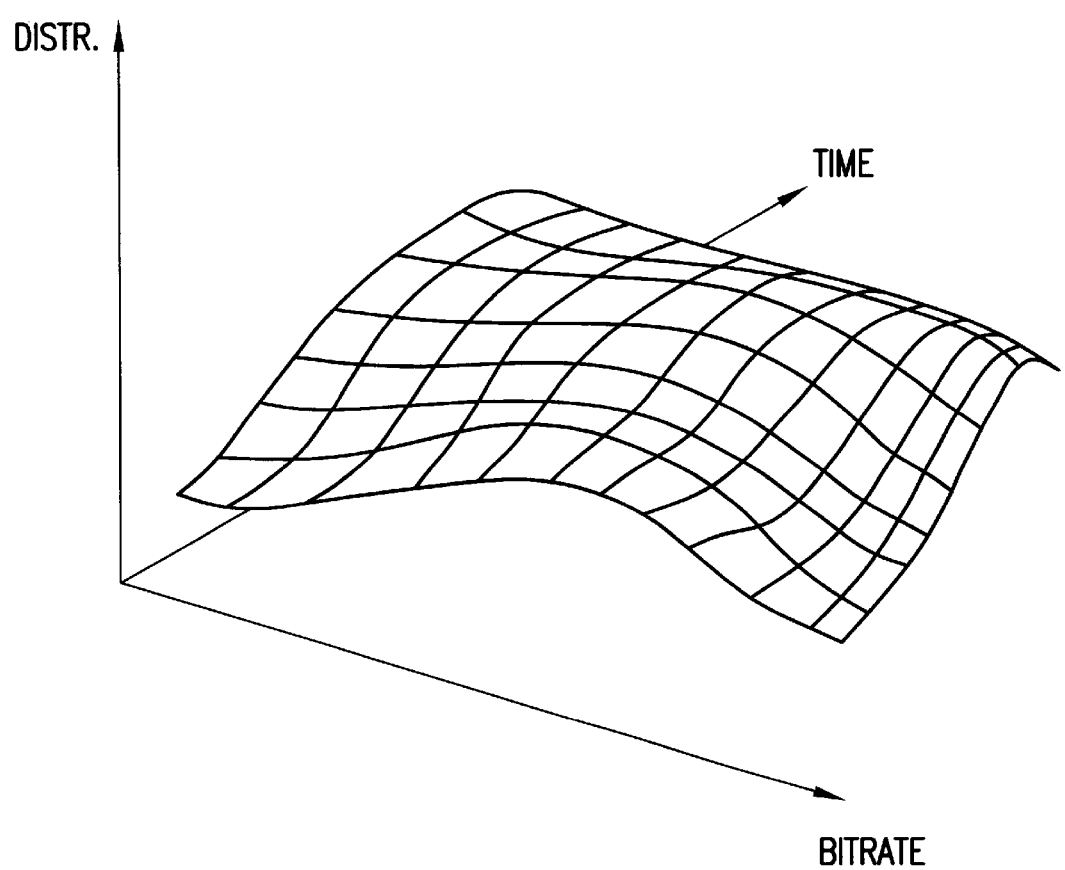
FIGS. 12A–C depict methods of displaying the TEA information to delineate QoS trends over time.
Figure 12B:
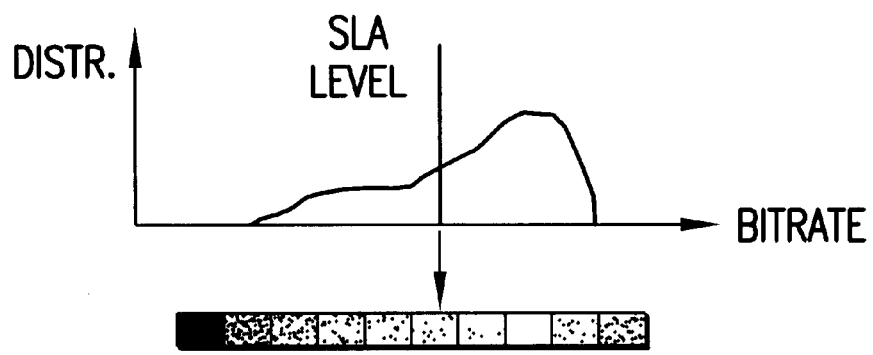
Figure 12C:
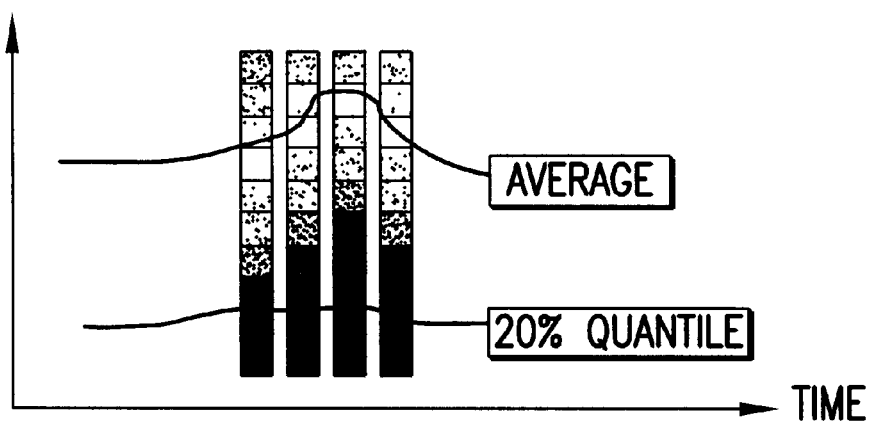

FIGS. 12A–C depict methods of displaying the TEA information to delineate QoS trends over time. This method of the present invention makes it possible to visualize the results of the TEA over time. Thus, trends in QoS can be analyzed by reviewing the TEA results over a period of time. To conveniently and informatively display trends in the TEA histogram over time, a three dimensional graph may be used as shown in FIG. 12A, or the histogram results may be color coded (e.g., brighter shades code high throughput and dark shades code low values) as in FIG. 12B and FIG. 12C, or other like method of display may be used.

Figure 13:
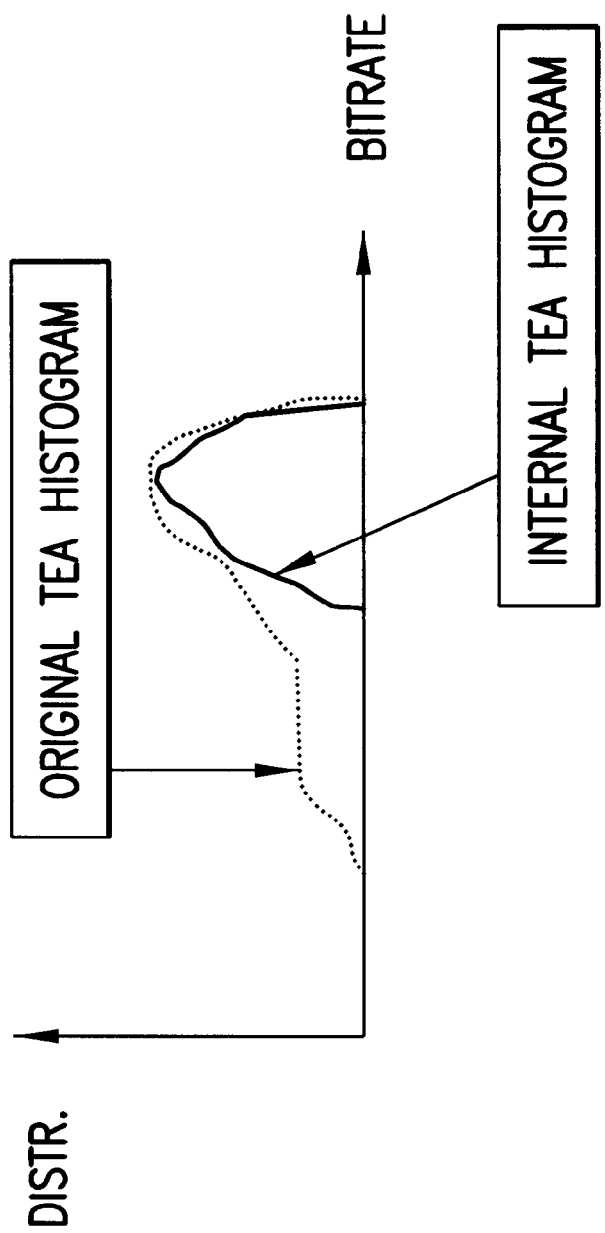
FIG. 13 is an internal/external TEA histogram which simultaneously displays information generated by the TEA pertaining to the internal network and the external network.

FIG. 13 is an internal/external TEA histogram which simultaneously displays information generated by the TEA pertaining to the internal network and the external network. As shown in the figure, the TEA histogram analysis can provide a global view, which may be used to directly approximate the ratio of violated SLAs end-to-end. This internal/external perspective is advantageous in network management, since it is important to know whether a problem observed in the TEA is caused within the managed area or is in the outside network.

The internal TEA histogram may be made, for example, by filtering out from the TEA generated statistics, those subscriber TEA records for which the bottleneck of the traffic was in the internal network. This is done by comparing the estimated internal and external packet losses for a subscriber. If the internal packet loss is greater than the external, then the bottleneck for this subscriber was in the internal network, i.e. the throughput efficiency of the subscriber was limited by the internal network. The external TEA histogram is created using the remaining records, i.e. those TEA measurements when the bottleneck was in the external network.

The aforementioned embodiments and description of the present invention are intended to be illustrative rather than restrictive. Many variations of implementing the present invention may be derived from the description contained herein by a person skilled in the art. All such variations and modifications are considered to be within the scope and spirit of the present invention, as defined by the following claims.

What is claimed is:

1. A method of monitoring quality of service (QoS) for an identified subscriber in a packet data network, the method comprising the steps of:

installing a monitor in the network, the monitor being in communication with inbound and outbound packets;

selecting a subset of all subscribers in the network to be currently monitored, said subset being representative of the identified subscriber;

accepting a plurality of data packets, at the monitor, each of said data packets having a header that identifies source and destination subscriber addresses, identifies a communication protocol, and identifies and application;

preprocessing the accepted packets to identify packets from the subset of currently monitored subscribers, strip off header information from the identified packets, and store the header information in a shared memory;

utilizing a hashing function to create a microflow record that includes QoS statistics for a plurality of data packet streams, each stream of data packets being associated with a different application being utilized by subscribers in the network;

creating a userflow record that includes aggregate QoS statistics for all applications being utilized by the identified subscriber;

providing the preprocessed header information from each identified data packet to an application-dependent statistical calculation function corresponding to the application identified in each header;

calculating QoS statistics for the identified application utilizing the corresponding application-dependent statistical calculation function;

updating the QoS statistics in the microflow record for the identified application; and updating the aggregate QoS statistics in the userflow record for the identified subscriber.

2. The method of claim 1, wherein the step of selecting a subset of subscribers to be monitored includes applying the inbound and outbound packets to a filtering function that utilizes a mixing function to select the subset of subscribers, said mixing function including the steps of:

shifting a subscriber Internet Protocol (IP) address to produce a shifted subscriber IP address; and comparing said shifted subscriber IP address with a value proportional to a tuning parameter.

3. The method of claim 1, wherein the step of installing the monitor in the network includes installing a passive network interface in the network, said interface including a first probe at an internal aggregation point, and a second probe at a border router.

4. The method of claim 1 wherein the step of updating the aggregate QoS statistics in the userflow record includes determining a source of QoS degradation for the identified subscriber based upon the QoS statistics in the userflow record.

5. The method of claim 1 wherein said microflow record stores values for a subscriber Internet Protocol (IP) address, a destination IP address, a subscriber port, and a destination port for each application data packet stream.

6. The method of claim 1 wherein the step of selecting a subset of subscribers to be monitored includes the steps of:

keeping track of when subscriber Transaction Control Protocol (TCP) connections are established; and selecting for the subset, subscribers with TCP connections that have been alive for a sufficient time to settle down.

7. The method of claim 1 wherein the step of calculating QoS statistics for the identified application utilizing the corresponding application-dependent statistical calculation function includes calculating, for Transaction Control Protocol (TCP) applications, an internal packet loss and an external packet loss at the monitoring point.

8. The method of claim 1 wherein the step of calculating QoS statistics for the identified application utilizing the corresponding application-dependent statistical calculation function includes calculating, for streaming and real-time applications, a delay variation and a packet loss between the monitoring point and an end-host.

9. The method of claim 1 wherein the step of calculating QoS statistics for the identified application utilizing the corresponding application-dependent statistical calculation function includes calculating, for Transaction Control Protocol (TCP) applications, stalled periods utilizing only TCP connections that always have a packet waiting to be sent.

10. The method of claim 1 wherein the step of calculating QoS statistics for the identified application utilizing the corresponding application-dependent statistical calculation function includes performing a Throughput Efficiency Analysis (TEA) to detect whether the network can provide the throughput promised for the identified subscriber in an associated Service Level Agreement (SLA).

11. The method of claim 10 wherein the step of performing a TEA analysis includes the steps of:

detecting the arrival of a TCP packet through a TCP connection;

determining whether the TCP connection is of the type that always has a packet waiting to be sent;

if so, determining whether the elapsed time since the TCP connection was last logged is greater than a predetermined time period;

if so, determining from the identified subscriber's userflow record, whether the identified subscriber has been logged during the predetermined time period; and if so, calculating the identified subscriber's total throughput based upon the information in the identified subscriber's userflow record, and taking into account all applications utilized by the identified subscriber during the predetermined time period.

12. A system for monitoring quality of service (QoS) for an identified subscriber in a packet data network, the system comprising:

a monitor in the network in communication with inbound and outbound packets, said monitor including:

prefiltering means for accepting a plurality of data packets associated with a selected subset of all subscribers in the network, said subset being representative of the identified subscriber; and preprocessing means for identifying packets from the subset of currently monitored subscribers, stripping off header information from identified packets, and storing the header information, wherein the header information identifies source and destination subscriber addresses, identifies a communication protocol, and identifies an application;

a shared memory for storing the header information;

a microflow record created from the stored header information that includes QoS statistics for a plurality of data packet streams, each stream of data packets being associated with a different application being utilized by subscribers in the network;

a userflow record created from the stored header information that includes aggregate QoS statistics for all applications being utilized by the identified subscriber;

at least one application-dependent statistical calculation function, each calculation function corresponding to a different application identified in the packet headers, said calculation function calculating QoS statistics for the identified application;

means for updating the QoS statistics in the microflow record for the identified application; and means for updating the aggregate QoS statistics in the userflow record for the identified subscriber.

13. The system of claim 12 wherein the prefiltering means includes a mixing function that selects the subset of subscribers by shifting a subscriber Internet Protocol (IP) address to produce a shifted subscriber IP address, and comparing the shifted subscriber IP address with a value proportional to a tuning parameter.

14. The system of claim 12 wherein the monitor also includes a first probe at an internal aggregation point in the network, and a second probe at a border router.

15. The system of claim 12 wherein the prefiltering means includes:

means for keeping track of when subscriber Transaction Control Protocol (TCP) connections are established; and means for selecting for the subset, subscribers with TCP connections that have been alive for a sufficient time to settle down.

16. The system of claim 12 wherein the at least one application-dependent statistical calculation function includes a Throughput Efficiency Analysis (TEA) that determines whether the network can provide the throughput promised for the identified subscriber in an associated Service Level Agreement (SLA).

* * * * *